(12) United States Patent
Choi et al.

(10) Patent No.: US 12,190,561 B2
(45) Date of Patent: Jan. 7, 2025

(54) METHOD FOR CLUSTERING AND IDENTIFYING ANIMALS BASED ON THE SHAPES, RELATIVE POSITIONS AND OTHER FEATURES OF BODY PARTS

(71) Applicants: Stephanie Sujin Choi, Seoul (KR); Hyeong In Choi, Seoul (KR)

(72) Inventors: Stephanie Sujin Choi, Seoul (KR); Hyeong In Choi, Seoul (KR)

( * ) Notice: Subject to any disclaimer, the term of this patent is extended or adjusted under 35 U.S.C. 154(b) by 0 days.

(21) Appl. No.: 18/201,367

(22) Filed: May 24, 2023

(65) Prior Publication Data

US 2023/0292709 A1  Sep. 21, 2023

Related U.S. Application Data

(62) Division of application No. 16/994,936, filed on Aug. 17, 2020.

(60) Provisional application No. 62/887,846, filed on Aug. 16, 2019.

(51) Int. Cl.
| | |
|---|---|
| *G06V 10/762* | (2022.01) |
| *A01K 11/00* | (2006.01) |
| *G06F 18/214* | (2023.01) |
| *G06F 18/2411* | (2023.01) |
| *G06F 18/2413* | (2023.01) |
| *G06V 10/764* | (2022.01) |
| *G06V 40/10* | (2022.01) |

(52) U.S. Cl.
CPC .......... *G06V 10/762* (2022.01); *A01K 11/006* (2013.01); *G06F 18/214* (2023.01); *G06F 18/2411* (2023.01); *G06F 18/2413* (2023.01); *G06V 10/765* (2022.01); *G06V 40/10* (2022.01)

(58) Field of Classification Search
CPC .... G06V 10/762; G06V 10/765; G06V 40/10; G06F 18/2411; G06F 18/2413; G06F 18/214

See application file for complete search history.

(56) References Cited

U.S. PATENT DOCUMENTS

| | | |
|---|---|---|
| 8,571,259 B2 | 10/2013 | Margolis et al. |
| 8,755,570 B2 | 6/2014 | Gomas et al. |
| 8,897,505 B2 | 11/2014 | Gokturk et al. |
| 9,183,429 B2 | 11/2015 | Qi et al. |
| 9,342,735 B2 | 5/2016 | Polimeno et al. |
| 10,268,880 B2 | 4/2019 | Wee et al. |

(Continued)

FOREIGN PATENT DOCUMENTS

| | | |
|---|---|---|
| CA | 2872841 C | 8/2019 |
| WO | 2017/001538 A1 | 1/2017 |

OTHER PUBLICATIONS

Lu, YuZhe, HongPing Pan, Shuai Wang, MingLiu Yang, L. WenGuang, and Bing Yan. "Morphological identification of wild, pond-farm and mangrove eco-farm adult Bostrychus sinensis." Journal of Southern Agriculture 48, No. 10 (2017): 1906-1911. (Year: 2017).*

*Primary Examiner* — David Perlman
(74) *Attorney, Agent, or Firm* — LRK PATENT LAW FIRM

(57) ABSTRACT

A method for the clustering and identification of animals in acquired images based on physical traits is provided, where a trait feature is a scalar or vector quantity that is a property of a trait and trait distance is a measure of discrepancy between the same trait features of two animals, and also introduced are several different ways of implementing clustering using trait features.

13 Claims, 9 Drawing Sheets

(56) References Cited

U.S. PATENT DOCUMENTS

| | | | | |
|---|---|---|---|---|
| 10,506,054 | B2* | 12/2019 | Grohman | H04L 12/4625 |
| 10,643,062 | B2 | 5/2020 | Polimeno et al. | |
| 2006/0083423 | A1* | 4/2006 | Brown | G06V 20/40 |
| | | | | 382/190 |
| 2006/0110049 | A1* | 5/2006 | Liang | G06T 7/20 |
| | | | | 382/224 |
| 2012/0288170 | A1* | 11/2012 | McVey | A01K 29/00 |
| | | | | 382/128 |
| 2014/0016872 | A1* | 1/2014 | Chao | G06F 16/5838 |
| | | | | 382/218 |
| 2014/0333775 | A1* | 11/2014 | Naikal | H04N 21/44008 |
| | | | | 348/159 |
| 2016/0259970 | A1* | 9/2016 | Wee | G06V 40/172 |
| 2020/0143157 | A1* | 5/2020 | Borchersen | A01K 11/00 |
| 2021/0042356 | A1* | 2/2021 | Ezov | G06F 18/22 |
| 2021/0042608 | A1* | 2/2021 | Sun | G06F 18/2413 |

* cited by examiner

| Breed | Head Front View | Head Profile View | Body Profile Contour |
|---|---|---|---|
| Basset Hound |  |  |  |
| Bordeaux Mastiff |  |  |  |
| Borzoi |  |  |  |
| Bull Terrier |  |  |  |
| Cavalier King Charles Spaniel |  |  |  |
| Doberman Pinscher |  |  |  |

| Breed | Head Front View | Head Profile View | Body Profile Contour |
|---|---|---|---|
| French Bulldog |  |  |  |
| German Shepherd |  |  |  |
| Labrador Retriever |  |  |  |
| Rottweiler |  |  |  |
| Russian Toy Terrier |  |  |  |
| Samoyed |  |  |  |
| Siberian Husky |  |  |  |

FIG. 7A
| $C_1$ | 0 ~ 0.4 | 0.4 ~ 0.8 | 0.8 ~ 1 |
|---|---|---|---|
| $C_2$ | 0 ~ $\pi/2$ | $\pi/2$ ~ $\pi$ | |
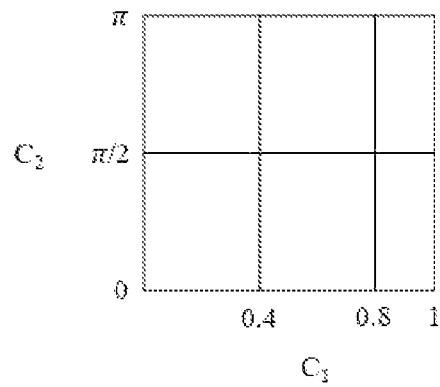
FIG. 7B
FIG. 7C
| $C_1$ | | ✓ | |
|---|---|---|---|
| $C_2$ | | ✓ | |
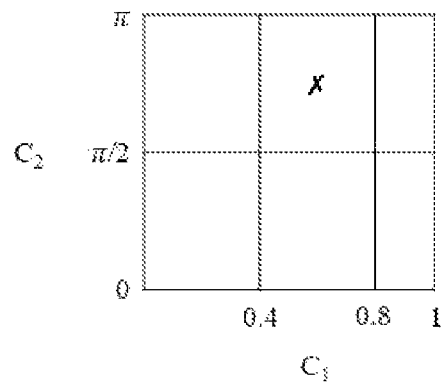
FIG. 7D
FIG. 7E
| $C_1$ | | | ✓ |
|---|---|---|---|
| $C_2$ | ✓ | | |
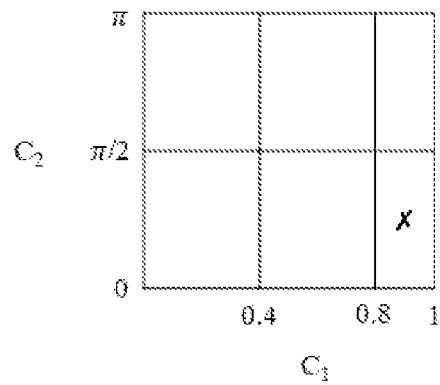
FIG. 7F

FIG. 8A

|       | 1 | 2 | 3 | 4 | 5 | 6 | 7 |
|-------|---|---|---|---|---|---|---|
| $C_1$ |   | ✓ |   |   |   |   |   |
| $C_2$ | ✓ |   |   |   |   |   |   |
| $C_3$ |   |   | ✓ |   |   |   |   |
| $C_4$ |   |   |   | ✓ |   |   |   |
| $C_5$ |   |   |   | ✓ |   |   |   |
| ⋮     |   |   |   |   |   |   |   |
| $C_k$ |   |   |   |   | ✓ |   |   |

FIG. 8B

|       | 1 | 2 | 3 | 4 | 5 | 6 | 7 |
|-------|---|---|---|---|---|---|---|
| $C_1$ | ✓ |   |   |   |   |   |   |
| $C_2$ | ✓ |   |   |   |   |   |   |
| $C_3$ |   |   | ✓ |   |   |   |   |
| $C_4$ |   |   |   |   | ✓ |   |   |
| $C_5$ |   |   |   | ✓ |   |   |   |
| ⋮     |   |   |   |   |   |   |   |
| $C_k$ |   | ✓ |   |   |   |   |   |

METHOD FOR CLUSTERING AND IDENTIFYING ANIMALS BASED ON THE SHAPES, RELATIVE POSITIONS AND OTHER FEATURES OF BODY PARTS

CROSS REFERENCE TO RELATED APPLICATIONS

This application is a division of U.S. patent application Ser. No. 16/994,936, filed on Aug. 17, 2020, which claims the benefit of U.S. Provisional Application No. 62/887,846, filed Aug. 16, 2019, the disclosure of which is incorporated by reference in their entirety herein.

BACKGROUND OF THE INVENTION

1. Field of the Invention

The present invention relates to a method for the clustering and identification of animals in acquired images based on physical traits, where a trait feature is a scalar or vector quantity that is a property of a trait and trait distance is a measure of discrepancy between the same trait features of two animals.

Also introduced are several different ways of implementing clustering using trait features. One such implementation of clustering is to bucketize each of the scalar or vector quantities of the trait features, where bucketizing means dividing the range of the scalar or vector quantities into several subintervals or subsets.

2. Description of Related Art

There have been methods for clustering and identification of animals in acquired frontal view and side view animal images based on physical traits, such as head and body shapes, the shapes, relative positions and proportions of individual characters on the head and body, and the nose, in a wide range of animals including cats, cattle, and horses. However, a more reliable, quick way of distinguishing animals of different breeds by facial and body recognition has been needed.

SUMMARY OF THE INVENTION

In one general aspect, there is provided a method of identifying animals, including: using acquired animal images; and using a plurality of trait distances, wherein the trait distance is a measure of discrepancy between corresponding trait features of two said animals, wherein the trait feature is a scalar or vector quantity that is a property of a trait of the animal, wherein the trait is a qualitative description of a character of the animal, and wherein the character is an abstract term referring to a characteristic of a specific body part of the animal.

In another general aspect, there is provided a method of identifying animals, including: a clustering step including: using a plurality of trait features; and performing clustering by partitioning a space of plurality of trait features into a set of clusters, wherein the space of plurality of trait features is a set of all possible values of the array of trait features in the plurality of trait features, wherein the partition is a division of the space of the plurality of trait features into non-overlapping subsets whose union makes up the whole of said space of the plurality of trait features, and wherein each of the non-overlapping subsets is a cluster; and a cluster membership assigning step including acquiring images of an animal; computing the trait features of the animal using the acquired images; and assigning a cluster membership of the animal using the computed trait features, wherein the cluster membership is a choice of a unique cluster to which the values of the computed trait features belong.

In another general aspect, there is provided a method of searching animals, including: acquiring animal images; using a plurality of trait features; computing the trait features of the animal; discovering a cluster to which the animal belongs; and confining a search scope to the animals in the same cluster.

BRIEF DESCRIPTION OF THE DRAWINGS

FIGS. 7A to 7F demonstrate two examples of a comprehensive cluster profile.

FIGS. 8A and 8B show an example of the bucket structure.

DETAILED DESCRIPTION OF THE INVENTION

Figure 1A:
FIGS. 1A and 1B show the front and profile views of the head as well as the body profile contour of various dog breeds.
Figure 1A:
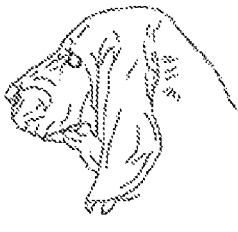
Figure 1A:
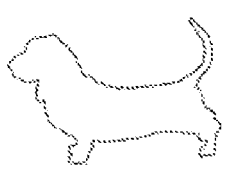
Figure 1A:
Figure 1A:
Figure 1A:
Figure 1A:
Figure 1A:
Figure 1A:
Figure 1A:
Figure 1A:
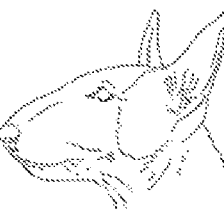
Figure 1A:
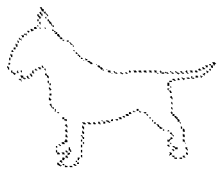
Figure 1A:
Figure 1A:
Figure 1A:
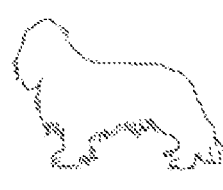
Figure 1A:
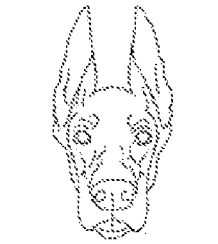
Figure 1A:
Figure 1A:
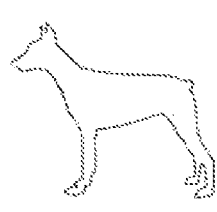

The present invention is a method for the clustering and identification of animals in acquired frontal view and side view animal images based on physical traits, specifically head and body shapes; the shapes, relative positions and proportions of individual characters on the head and body; and the nose. While the method as described in the following is applicable to a wide range of animals—including cats, cattle, and even horses—the present invention uses canines as a primary example to demonstrate the method. It should be understood that the images acquired for clustering and identification can be single still images or video, which can be construed as a series of consecutive still images.

For clarification, the special terminologies used in the present invention must first be defined. Character is an abstract term referring to a characteristic of a specific body part (for example, ear shape). A physical trait, or simply trait, is a qualitative description of the character (for example, upright ears). Trait feature is a scalar or vector quantity that is a property of a trait (for example, the angle between the line connecting the base of an ear at the top of the head to the tip of the ear and the vertical line passing through the base of the ear), and trait feature is calculated from the front or side view image of an animal. Trait distance is a measure of discrepancy between the same trait features of two animals. If the trait feature is a vector quantity, then the corresponding trait distance is also a vector quantity of the same dimension. There are some exceptions to this rule: for example, the body profile contour trait feature. As is described below, a body profile contour trait feature is defined as a profile set, while the body profile contour trait distance is a scalar quantity.

Moreover, although in mathematics angle is measured according to the direction in which it is measured so that the angle can have a positive or negative value, in the present invention we adopt a convention so that the angle measuring direction is disregarded so that the value of the angle is always a positive value between zero and π (180 degrees).

Facial and body recognition as described in the present invention is a quick and reliable way of distinguishing animals of different breeds. The facial and bodily traits as described in this invention are also very good means of clustering animals into smaller groups. This clustering method, when paired with nose pattern biometric recognition, has the beneficial effect of narrowing down the search space, hence increasing search speed and identification accuracy. Another upside is the lowering of both the False Acceptance Rate (FAR) and False Rejection Rate (FRR) simultaneously. Moreover, whereas nose pattern recognition requires capturing minute details on a small portion of the face, good quality images for facial and body recognition are much easier to acquire, which enables surveillance-type identification that can be done from longer distances. Also, for some instances where the animal's nose is too damaged for nose pattern recognition, facial and body recognition can be a solid backup option.

The preferred embodiment of the present invention pertains to such characters as head shape, ear shape, tail shape, eye and nose positions on the face, and body profile contour. However, there are many other animal traits that are not explicitly described here to which the present invention's spirit and methodology can be easily applied to extract relevant trait features and then define relevant trait distances. Also, even for the same trait, there may be different, but similar, ways of defining and calculating the trait features and trait distances. Therefore, the scope of the present invention should be interpreted as covering such omissions and variations. Moreover, the preferred embodiment given here is only one example of how the present invention can be applied to the general problem of clustering and identifying animals using trait distances, and many similar variations are possible without going beyond the scope of the present invention.

Other terminologies used in the present invention are a plurality of trait features and a plurality of trait differences. In actual implementation of the present invention, not all possible trait features may be used for clustering or identification. Depending on the accuracy and usability requirements of the application, only a subset of all possible trait features may be used. In the present invention, the term plurality of trait features is used to denote the list of trait features being used for clustering or identification. This list may vary from one instance of application to another. Given images of two animals, the list of trait distances corresponding to the traits in the plurality of trait features is called the plurality of trait distances; to be more specific, it may be called the plurality of trait distances of the two animals.

Here the present invention is described using dogs as an example. Within the dog species there are traits of certain characters that can be used to identify the specific breed of a dog—or at least the possible genetic mix, in the case of non-purebreds. Such characters include: head shape, ear shape, size, tail shape, etc. As can be seen in FIG. 1, dogs of different breeds display a wide range of variations is their physical traits. It should be noted, however, that although there are standards for each character for each breed, individuals may deviate (in shape, length, etc.) somewhat depending on the breeding and other genetic and circumstantial factors.

There are three primary traits for the head shape character, determined by taking into account the proportion of the muzzle (the part of the head that includes the nose and mouth) to the whole head. Dolichocephalics are long-headed dogs with pointy snouts, with muzzles that are narrow and more than half the length of the entire head. Mesocephalics have muzzles that are about equal to half the length and width of the head. Brachycephalics are wide-skulled and have muzzles that are shorter than half the length of the head and relatively wide.

Figure 2:
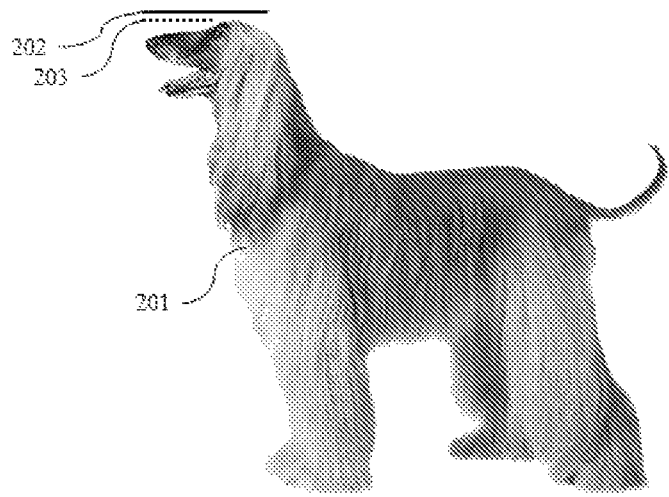
FIG. 2 illustrates the difference in proportion between the muzzle and the whole head for dolichocephalics, mesocephalics, and brachycephalics.
Figure 2:
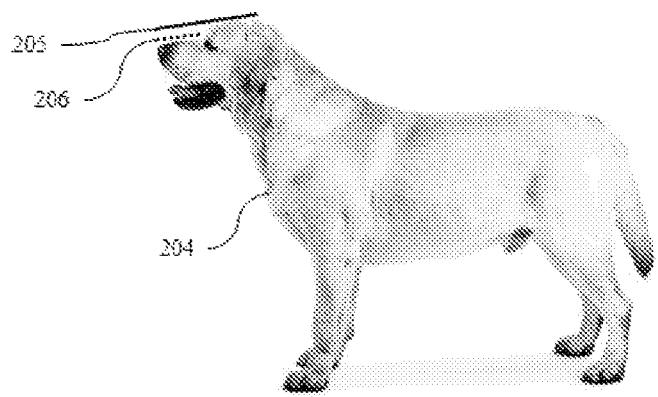
Figure 2:
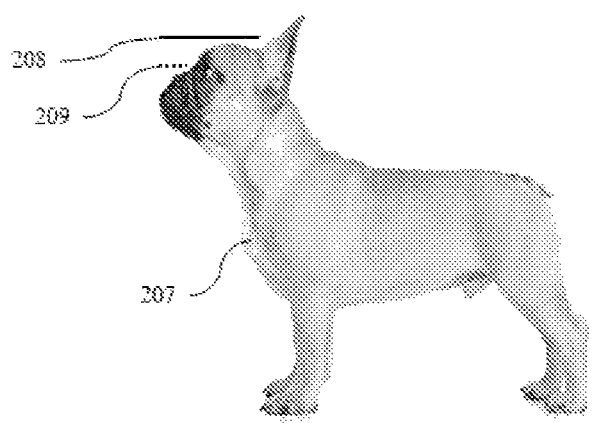

Illustrating the above is FIG. 2. For an Afghan Hound 201, which is dolichocephalic, the length of the muzzle 203 is greater than half the length of the entire head 202. For a Labrador Retriever 204, which is mesocephalic, the length of the muzzle 206 is about equal to half the length of the entire head 205. For a French Bulldog, which is brachycephalic, the length of the muzzle 209 is less than half the length of the entire head 208.

The trait of head shape character can be defined by a trait feature, which is the ratio of the muzzle length over the head length. So, for instance, in FIG. 2, it is the ratio of the length of 203 over the length of 202; and similarly, the ratio of the length of 206 over the length of 205, and so on. This ratio is the head shape trait feature.

When comparing two animals, the head shape trait distance between the two animals is defined as the absolute value of the difference between the head shape trait features, i.e., in this case, the two ratios of the muzzle length over the head length. For instance, let $r_A$ and $r_B$ be such ratios (trait features) of the animals A and B, then the trait distance is given as $|r_A - r_B|$.

The ear shape character for dogs comes with a greater variety of traits: drop ear, filbert-shaped ear, rose ear, folded ear, V-shaped ear, cropped ear, button ear, cocked (semi-cropped or semi-pricked) ear, prick ear, blunt-tipped or round-tipped ear, bat ear, candle flame ear, hooded ear, etc. Each category is distinguished from another by the shape, size, or fold of the ear. However, since the differences may appear miniscule to be finely discerned by image processing, it is easier to divide ear shapes into three main groups: floppy or drop ears, upright ears, and semi-pricked ears. Floppy or drop ears hang down next to the dog's head. Upright ears stand erect and can be either rounded or pointed. Semi-pricked ears fall somewhere in between the other two types, and are partially erect with the tops of the ears bending forward.

Figure 3:
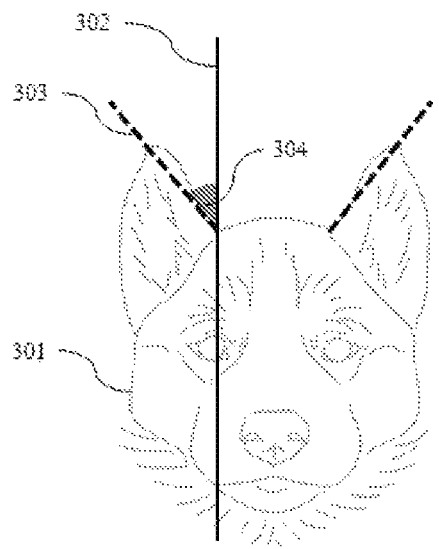
FIG. 3 illustrates one way of determining the ear shape of a canine.
Figure 3:
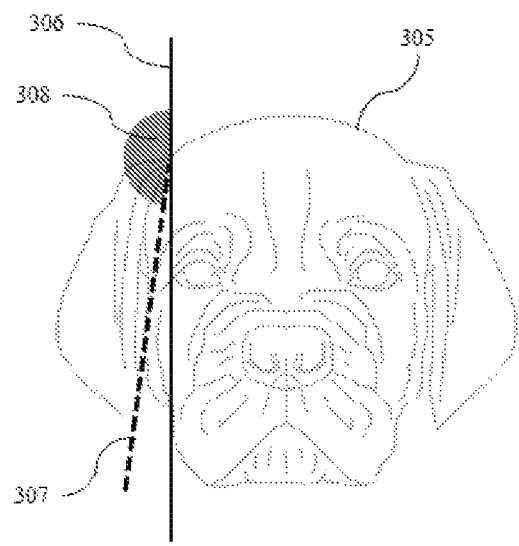
Figure 3:
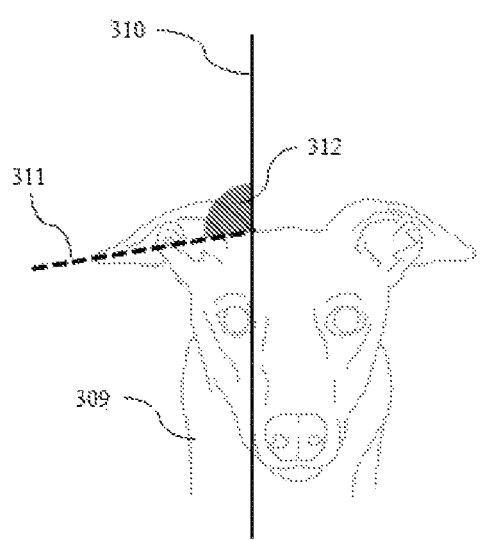
Figure 3:
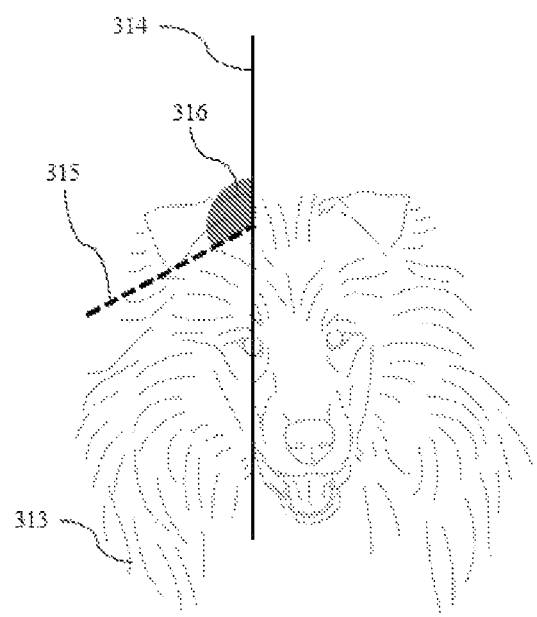

FIG. 3 demonstrates possible ways to determine the general ear shape of a given canine. In FIG. 3, lines 303, 307, 311, 315 that connect the base of the ear at the top of the head to the tip of the ear, and vertical lines 302, 306, 310, 314, that pass through said base of the ear are drawn. For a Siberian Husky 301, the angle 304 between line 303 and the vertical line 302 is less than 90 degrees, making its ears upright. For a Bordeaux Mastiff 305, the angle 308 between line 307 and the vertical line 306 is much greater than 90 degrees, making its ears drop ears. For a Greyhound 309, the angle 312 between line 311 and the vertical line 310 is somewhat greater than 90 degrees, making its ears semi-pricked. Likewise, for a Rough Collie 313, the angle 316 between line 315 and the vertical line 314 is somewhat greater than 90 degrees, making its ears semi-pricked.

Ear shape traits can be defined by the numerical value of a trait feature, which is the angle between the line connecting the base of an ear at the top of the head to the tip of the ear and the vertical line passing through the base of the ear. For instance, it is the angle 304 between lines 303 and 302 in FIG. 3A, and similarly the angle 308 and so on. When comparing two animals, the ear shape trait distance between the two animals is defined as the absolute value of the difference between the two angles. For instance, let $\theta_A$ and $\theta_B$ be such angles of the animals A and B, then the trait distance is given as $|\theta_A - \theta_B|$.

Size—as in both height and build as well as weight—is another feature that can be used to identify dogs. The general dog sizes by weight are as follows: toy, up to 12 pounds; small, 12 to 25 pounds; medium 25 to 50 pounds; large 50 to 100 pounds; and extra-large, over 100 pounds. While size is usually an informative feature for identifying a dog in real life, without a scale indicator it may not be as useful in mere image-based identification. To get the numerical value of this trait, one has to rely on physical measurement.

Figure 4:
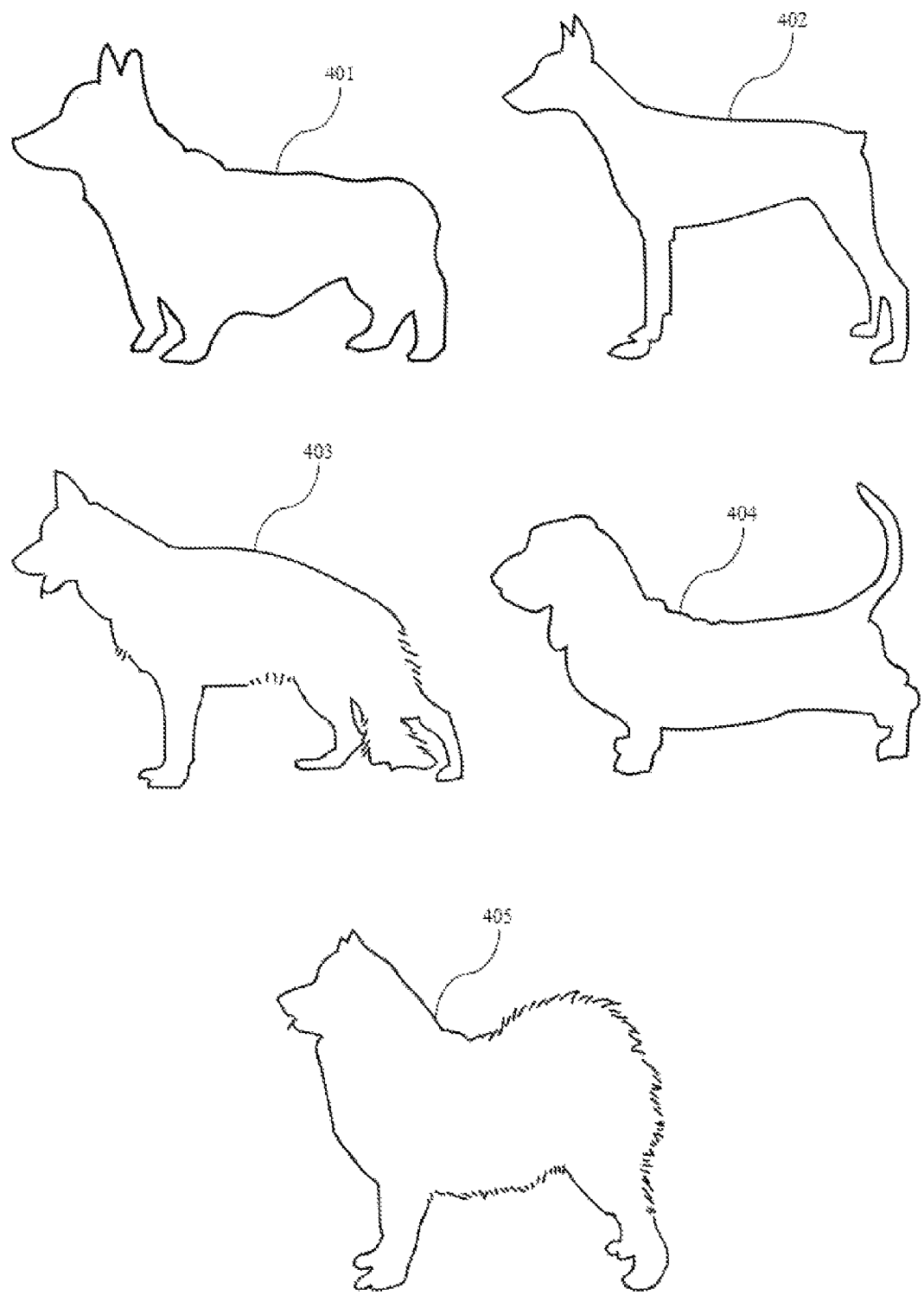
FIG. 4 illustrates different tail shapes of canines.

The tail shape character for dogs also comes with a variety of traits, each with different shapes, sizes, lengths, and thicknesses. As seen in FIG. 4, some have short 401 or docked tails 402; straight, low-hanging tails 403; thinner, raised tails 404; curved or coiled tails 405; etc.

The tail shape character has many traits, wherein the tail trait feature is a vector quantity with three components: the first component is the ratio of tail length over the body length; the second component is the ratio of the tail thickness over the tail length; and the third component is the angle between a horizontal line and the line connecting the start of the tail to the end of the tail.

The tail shape trait distance is therefore also a vector quantity with three components, the first component being $|L_A - L_B|$ wherein $L_A$ and $L_B$ are ratios of the tail length over the body length of the animals A and B; the second component being $|T_A - T_B|$ wherein $T_A$ and $T_B$ are ratios of the tail thickness over the tail length of the animals A and B; and $|\theta_A - \theta_B|$ wherein $\theta_A$ and $\theta_B$ are angles between a horizontal line and the line connecting the start of the tail to the end of the tail.

Figure 5:
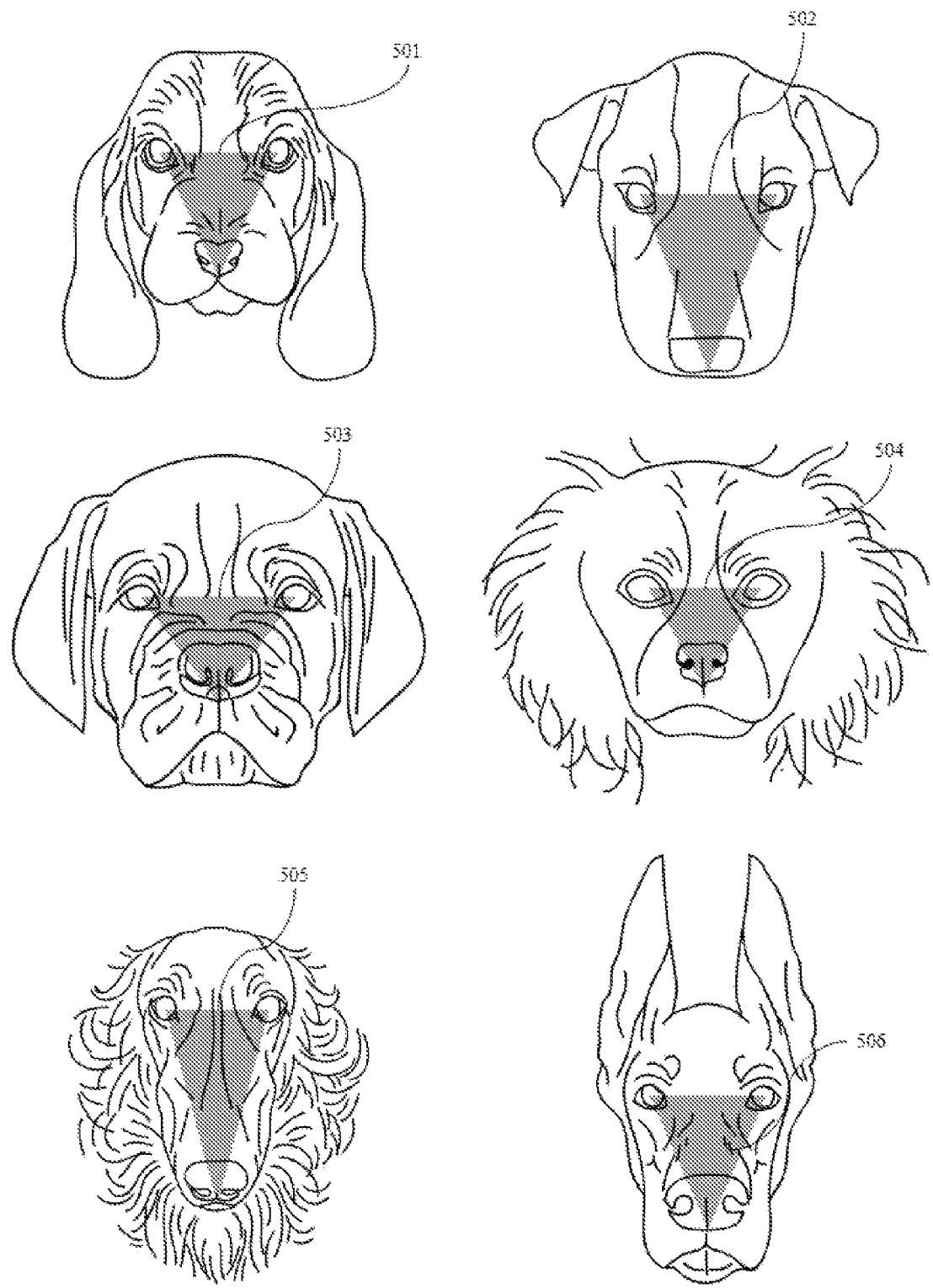
FIG. 5 illustrates using the relative positions of the eyes and nose for biometric identification.
Figure 6:
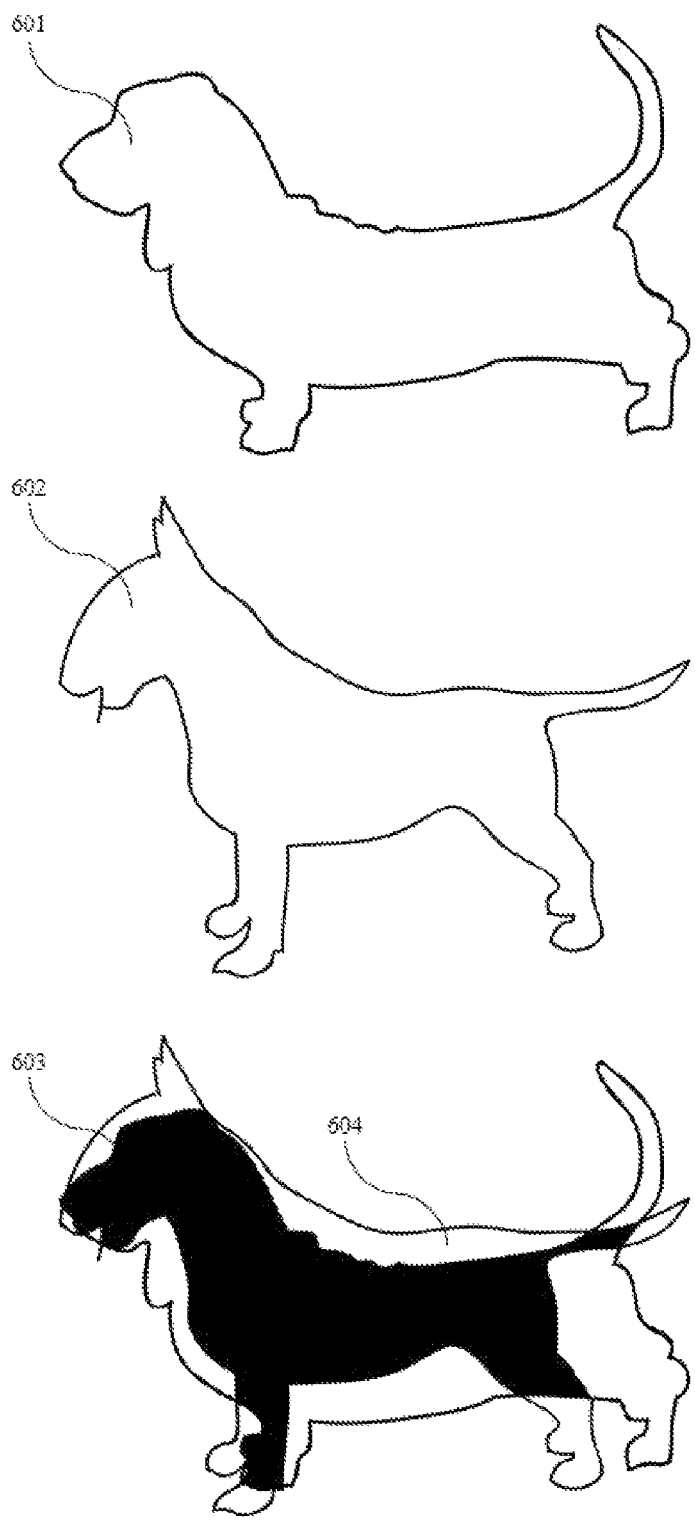
FIG. 6 illustrates a symmetric difference between body profile contours of two animals.

The relative positions of the eyes and the nose also demonstrate a very useful trait. FIG. 5 illustrates the different relative positions of the eyes and nose for six different breeds, where the center of each eye and the bottom tip of the philtrum are connected to form a triangle 501, 502, 503, 504, 505, 506. Each breed has a range of standard relative distances and angles between the eyes and the nose, with each individual of a breed displaying small variations within the range. Not only do different breeds have different standard ranges of distances between the eyes and the nose, such distances and proportions can vary meaningfully among individuals of the same breed.

Relative eye and nose position traits are defined by a trait feature, which is the bottom angle of the triangle formed by connecting the center of each eye and the bottom tip of the philtrum. Since this triangle can be viewed as an isosceles triangle, the bottom angle will determine all three inner angles.

When comparing two animals, the relative eye and nose position trait distance between the two animals is defined as the absolute value of the difference between the two bottom angles. For instance, let $\theta_A$ and $\theta_B$ be the bottom angles of the animals A and B, then the trait distance is given as $|\theta_A - \theta_B|$.

Another character that can be used for distinguishing individuals is the overall body profile contour, as seen FIG. 1. Each breed has a characteristically standard body shape and set of proportions—the shape of the torso, leg shape and length, head shape, tail shape, etc.—with each animal having some individual variations due to genetics, fitness level, etc.

Body profile contour traits can defined in many different ways. For instance, as was done for the tail shape character, one can come up with several ratios like the ratio of the leg length over the height, etc. In view of what was done above, various ways of defining such ratios is within the scope of this invention. Here, we present another way of incorporating the overall body shape. First, normalize by resizing and rescaling the body profile contour so that it fits in a bounding box of fixed size, say a 200×100 pixel box. The resulting trait feature is the set of pixels 601, 602 that lies inside the body profile contour, which in the present invention is called a profile set. This profile set is also identified with a binary image of dimension of the bounding box in which the pixel in the profile set is given value 1 and 0 otherwise. Since a two-dimensional array is often treated as a long vector, adopting this convention, in the present invention a profile set is regarded as a vector quantity whose component has the value 0 or 1.

When comparing two animals, the body profile contour trait distance between the two animals is defined as the size of the symmetric difference 604 between the two profile sets, which are the pixels that lie outside the overlapping pixels 603 between the two body profile contours, normalized by dividing by size of the bounding box. This quantity is called a normalized size of symmetric differences of profile sets of two animals. For instance, let $S_A$ and $S_B$ be the profile sets of the animals A and B. Then trait distance is the size of the set $$S_A \triangle S_B = (S_A \setminus S_B) \cup (S_B \setminus S_A),$$

which is normalized by dividing by size of the bounding box (in this example, it is 20000=200×100), where the backslash (\) denotes the set-theoretic difference.

When two animals are being compared for animal identification, the combined distance for matching is calculated as follows. Let $d_1, d_2, \ldots d_N$ be a plurality of trait distances. With a big enough data set, one can apply one of many well-known methods in machine learning to train a combined distance d. A simplest example of the combined distance d is the weighted linear combination of $d_1, \ldots, d_N$ given as $$d = c_1 * d_1 + c_2 * d_2 + \ldots + c_N * d_N,$$

where $c_1, c_2, \ldots c_N$ are weighting coefficients to be determined by data. In case, $d_i$ is a vector quantity, $c_i$ is also a vector quantity of the same dimension so that $c_i * d_i$ is a dot product of vectors. For example, if $d_i$ is of dimension 3, say, $d_i = (d_{i1}, d_{i2}, d_{i3})$, then $c_i$ is also of dimension 3, say, of the form $c_i = (c_{i1}, c_{i2}, c_{i3})$ so that $c_i * d_i = c_{i1} * d_{i1} + c_{i2} * d_{i2} + c_{i3} * d_{i3}$ becomes a scalar value.

In general, the combined distance function d is defined as a function $d = f(d_1, \ldots, d_N; \theta)$ of the plurality of trait distances $d_1, \ldots, d_N$, where $\theta$ is a totality of parameters of the function. The weighted linear combination above is a simple example of the combined distance function, while, in general, a combined distance function can be more complicated.

A usual way of finding (training) the combined distance function with given data is to use one of the machine learning algorithms such as Neural Networks, Support Vector Machine, Random Forests or Gradient Boosting Machine, etc.

These methods are well-known in the art of machine learning. In the course of training, a threshold value is also found (trained). Once a combined distance function and a threshold are determined, the identification is done as follows: if the value d of the combined distance function of the images of two animals being compared is greater than the threshold, the identities of the two animals are judged as different; and if the value d of the combined distance function of the images of two animals being compared is less than or equal to the threshold, the identities of the two animals are judged as the same.

Nose pattern biometric identification may also be understood in this context, where the nose is a character, the unique nose pattern a trait, and the individual grooving and beading pattern (size, position, etc. of the grooves and beads) the measurable trait features. Comparing and matching nose patterns from two animals is essentially calculating the nose pattern trait distance by comparing the grooving and beading trait features. It should be noted that nose color (i.e. black, tan, etc.) and shape are also characters with discernible traits. However, using the nose color or shape trait alone will more often than not be insufficient to reliably compare and match two different animals of the same species. Including nose pattern in the list of traits to be compared maximizes the identification accuracy, while the inclusion of the other characters contributes to increasing the search efficiency.

All of the aforementioned trait features can be used to do clustering. Before describing what clustering is in the present invention, some terminologies must be fixed. First, a trait feature is a scalar or vector quantity. For example, given a plurality of trait features, let $(C_1, \ldots, C_k)$ be an array of such quantities. The set of all possible values of the array is called the space of plurality of trait features. When the plurality of trait feature is obvious from context, it is simply called the space of trait features. Clustering is a way of partitioning the space of plurality of trait features into a set of non-overlapping subsets, each of which is called a cluster, so that the union of such clusters makes up the whole of the space of trait features. Every animal, by calculating the trait features in the plurality of trait features, is assigned a unique membership in one and only one cluster. From this clustering point of view, animals in the same cluster are deemed similar for that trait feature. In other words, clustering is a way of grouping animals with similar trait features into groups (clusters).

The present invention introduces several different ways of implementing clustering using trait features. One implementation of clustering is to bucketize each of the scalar or vector quantities of the trait features. Bucketizing here means dividing the range of the scalar or vector quantities into several subintervals or subsets. There are many ways of doing bucketization: one may use a simple equal division of the range of the scalar or vector quantities, or one may use the change point method in statistics; or one may use clustering algorithms of machine learning. Bucketizing can also be done using known morphological classifications of the phenotypic traits. Or, one may use the breed data as a guideline for bucketizing.

FIGS. 7A-7F are a simple example to illustrate the relationship between the bucketizing and the space of a plurality of trait features. In this example, the plurality of trait features consists of two trait features $C_1$ and $C_2$. Suppose the range of values of $C_1$ is [0,1] and that of $C_2$ is [0, $\pi$] and suppose the feature $C_1$ is divided into three buckets [0, 0.4], [0.4, 0.8] and [0.8, 1] and the feature $C_2$ into 2 buckets [0, $\pi/2$] and [$\pi/2$, $\pi$]. In FIG. 7A, the first row has 3 cells corresponding to these three buckets [0, 0.4], [0.4, 0.8] and [0.8, 1] and the second row two cells corresponding to these two buckets [0, $\pi/2$] and [$\pi/2$, $\pi$]. In the present invention, the table in FIG. 7A is called a bucket structure. The space of plurality of trait features in this case is a two-dimensional rectangle in FIG. 7B whose horizontal length is 1 and vertical length $\pi$. The x-coordinate is divided according to the bucket division of $C_1$ and the y-coordinate is divided according to the bucket division of $C_2$. Thus, the space of plurality of trait features, i.e., the two dimensional rectangle, is partitioned into six non-overlapping subsets whose union makes up the whole of the space of plurality of trait features as in FIG. 7B. This partitioning is commonly known as doing clustering or simply clustering. Each of these six subsets is called a cluster. Suppose an image of an animal is given and suppose one computes the values of trait features $C_1$ and $C_2$ and comes up with 0.5 for and $2\pi/3$. Its $C_1$ value falls into the second bucket and its $C_2$ value falls into the second bucket. These buckets are checked in FIG. 7C. In the present invention, this pattern of choosing a bucket in each row is called a bucket pattern of an animal. The cluster corresponding to this particular bucket pattern is marked with an x-mark in FIG. 7D. In the present invention, this way of fixing the cluster for an animal is called the assigning of cluster membership of an animal. Suppose there is another animal with computed values of $C_1$ that is 0.9 and $C_2$ that is $\pi/4$. Then this $C_1$ value falls into the third bucket in the first row and this $C_2$ value falls into the first bucket of the second row, as in FIG. 7E. These buckets are checked in FIG. 7F that depicts the bucket pattern of this animal. The cluster assigned to this animal, i.e., the cluster corresponding to this bucket pattern, is marked with an x-mark in FIG. 7F.

When bucketizing, the number of buckets may vary from one trait feature to another. For example, FIGS. 8A and 8B show an example of the bucket structure. Trait feature $C_1$ has five buckets, $C_2$ has four buckets, and $C_3$ has seven buckets. For a trait feature that is a vector quantity, each component of the vector is separately bucketized.

Figure 1B:
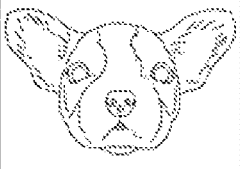
Figure 1B:
Figure 1B:
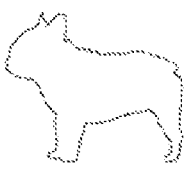
Figure 1B:
Figure 1B:
Figure 1B:
Figure 1B:
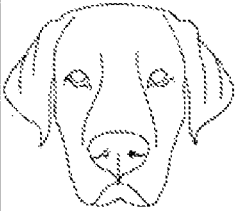
Figure 1B:
Figure 1B:
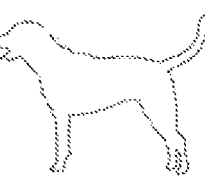
Figure 1B:
Figure 1B:
Figure 1B:
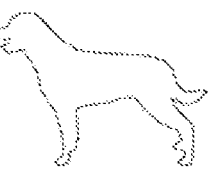
Figure 1B:
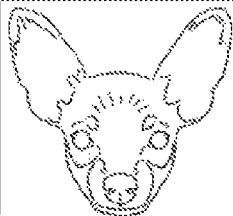
Figure 1B:
Figure 1B:
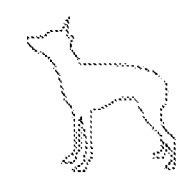
Figure 1B:
Figure 1B:
Figure 1B:
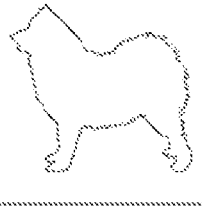
Figure 1B:
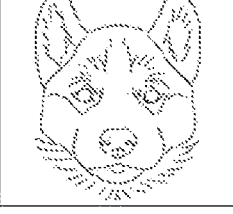
Figure 1B:
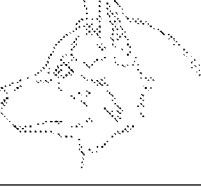
Figure 1B:
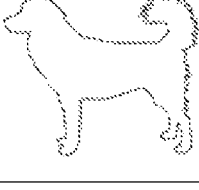

However, in the case of the body profile contour trait feature, bucketizing may be done in the following way. A body profile contour trait feature is a profile set and this profile set can be identified with a binary image in the bounding box. Then image classification method is applied to classify images into several categories (buckets). To do the image classification, the set of image labels must be defined before the training. One simply way of providing such labels is to use known morphological classifications of the body profile contour trait. For example, the first and last columns of FIGS. 1A and 1B are examples of the body profile contour trait that can be used as labels.

For a training set consisting of profile contours with labels (buckets), one can train an image classifier, which is very well-known in the art of deep learning machine vision; and any of those algorithms can be employed to train an image classifier. With a trained image classifier, the label (bucket) of any profile set is easily calculated.

Once buckets are fixed, hence the bucket structure is fixed, the cluster membership is easily determined. Namely, given an image of an animal, first the trait features in the plurality of trait features are computed, then the computed trait features are compared with the bucket division, and then the appropriate bucket pattern is determined. FIGS. 8A and 8B show two examples of bucket patterns: the bucket pattern of Animal A in FIG. 8A and animal B in FIG. 8B. Each of these bucket patterns represents a cluster. This way, each animal is described by a unique bucket pattern it belongs to. It should be noted that two animals having different bucket patterns must be different individuals.

In a certain case, a trait feature may not be available, i.e. missing, or incomputable so that the corresponding row in FIGS. 8A and 8B cannot be checked. For example, suppose there is an animal C whose first row is unchecked, but the rest of the rows have the same pattern as animal A. In this case, animal C's unique cluster membership cannot be ascertained, but it must belong to one of the five clusters whose $C_1$ bucket is one of the five possible buckets in row 1, while the other rows $C_2, \ldots, C_k$ have the same buckets checked as for animal A. So, in this case, the animal C's cluster membership can be ascertained as belonging to the union of the five clusters. A similar situation may arise in the case a trait feature computation is not reliable. Say, the computation result is ambiguous so that one can ascertain the first row's bucket is either the first one or second, but cannot tell precisely which is correct. Suppose the rest of the rows have the same buckets checked as for animal A. In this case, the animal C's cluster membership can be ascertained as belonging to the union of the two clusters.

One can also do clustering without creating a priori bucket structure by simply employing any well-known machine learning clustering algorithms such as simple K-means to hierarchical clustering to more sophisticated spectral, and so on.

The workhorse in animal biometrics is the animal nose pattern biometric identification. However, when it comes to searching, especially ascertaining the identity of an animal (say, a stray dog) in a huge animal biometric database, it will be computationally quite taxing to do an exhaustive search. It is even more aggravating, if such search requests come frequently. Clustering combined with animal nose pattern identification helps alleviate this kind of problem. Since there are large numbers of clusters, each cluster has far fewer animals belonging to it. So, when a search request arrives, an exhaustive search can be avoided by confining the search to animals in a particular cluster group.

Also, if two animals belong to different clusters, they are easily judged to have different identities without resorting further to animal nose print identification. This helps reduce False Acceptance in animal identification.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of clustering animals, the method comprising:
　a clustering step comprising:
　　using a plurality of trait features; and
　　performing clustering by partitioning a space of plurality of trait features into a set of clusters,
　　　wherein the space of plurality of trait features is a set of all possible values of the array of trait features in the plurality of trait features,
　　　wherein the partition is a division of the space of the plurality of trait features into non-overlapping subsets whose union makes up the whole of said space of the plurality of trait features, and
　　　wherein each of the non-overlapping subsets is a cluster; and
　a cluster membership assigning step comprising:
　　acquiring images of an animal;
　　computing the trait features of the animal using the acquired images; and
　　assigning a cluster membership of the animal using the computed trait features, wherein the cluster membership is a choice of a unique cluster to which the values of the computed trait features belong, wherein the trait feature relates to at least one from the group consisting of head shape, ear, tail shape, relative eye and nose position, body profile contour, and nose pattern, wherein the method further comprises:
labeling the body profile contour images for a binary image classifier;
defining labels as buckets for the body profile contour trait feature;
training the binary image classifier using training data with said labeling; and
determining the bucket membership of the body profile contour trait feature by running the trained binary image classifier for the acquired images of the animal.

2. The method of claim 1, further comprising:
bucketizing the trait features of the plurality of trait features; and
performing clustering by partitioning the space of the plurality of trait features using buckets of the trait features,
wherein bucketizing is dividing a range of the trait feature into non-overlapping subintervals, and
wherein for the trait feature that is a vector quantity, the division is done for each component of the vector.

3. The method of claim 2, further comprising:
using known morphological classifications of the trait features of the animal; and
bucketizing according to the known morphological classifications.

4. The method of claim 1, further comprising:
using a long distance image capture for a surveillance-type identification.

5. The method of claim 1, wherein the animals are dogs, cats, cattle, or horses.

6. The method of claim 1, further comprising:
computing a ratio of a muzzle length over a head length; and
defining the ratio as the head shape trait feature.

7. The method of claim 1, further comprising:
computing an angle between a line connecting a base of the ear at a top of the head to a tip of the ear and a vertical line passing through the base of the ear; and
defining the angle as the ear shape trait feature.

8. The method of claim 1, further comprising:
defining the tail shape trait feature by the vector quantity; and
determining components of the vector quantity by computing:
a ratio of a tail length over a body length,
a ratio of an average tail thickness over the tail length, and
an angle between a horizontal line and a line connecting a start of the tail to an end of the tail.

9. The method of claim 1, further comprising:
computing a bottom angle of a triangle formed by connecting centers of both eyes and a bottom tip of a philtrum; and defining the angle as the relative eye and nose position trait feature.

10. The method of claim 1, further comprising:
computing a ratio of a leg length over a height; and
defining the ratio as the body profile contour trait feature.

11. The method of claim 1, further comprising:
defining the body profile contour trait feature by a profile set; and
computing the profile set by steps comprising:
resizing and rescaling the body profile contour to fit in a bounding box of a fixed size; and
selecting pixels that lie within the resized and rescaled body profile contour.

12. The method of claim 2, further comprising:
assigning multiple buckets for missing trait features;
assigning multiple buckets for the trait features whose computation result is ambiguous; and
assigning multiple cluster membership for said missing or ambiguous trait features.

13. A method of clustering animals, the method comprising:
a clustering step comprising:
using a plurality of trait features; and
performing clustering by partitioning a space of plurality of trait features into a set of clusters,
wherein the space of plurality of trait features is a set of all possible values of the array of trait features in the plurality of trait features,
wherein the partition is a division of the space of the plurality of trait features into non-overlapping subsets whose union makes up the whole of said space of the plurality of trait features, and
wherein each of the non-overlapping subsets is a cluster;
a cluster membership assigning step comprising:
acquiring images of an animal;
computing the trait features of the animal using the acquired images; and
assigning a cluster membership of the animal using the computed trait features, wherein the cluster membership is a choice of a unique cluster to which the values of the computed trait features belong;
wherein the method further comprises:
bucketizing the trait features of the plurality of trait features;
performing clustering by partitioning the space of the plurality of trait features using buckets of the trait features,
wherein bucketizing is dividing a range of the trait feature into non-overlapping subintervals, and
wherein for the trait feature that is a vector quantity, the division is done for each component of the vector;
assigning multiple buckets for missing trait features;
assigning multiple buckets for the trait features whose computation result is ambiguous; and
assigning multiple cluster membership for said missing or ambiguous trait features.

* * * * *